(12) United States Patent
Brock et al.

(10) Patent No.: US 6,928,549 B2
(45) Date of Patent: Aug. 9, 2005

(54) DYNAMIC INTRUSION DETECTION FOR COMPUTER SYSTEMS

(75) Inventors: Ashley Anderson Brock, Morrisville, NC (US); Nathaniel Wook Kim, Raleigh, NC (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 09/901,443

(22) Filed: Jul. 9, 2001

(65) Prior Publication Data

US 2003/0009693 A1 Jan. 9, 2003

(51) Int. Cl.[7] .............................................. G06F 1/24
(52) U.S. Cl. ...................... 713/194; 713/189; 713/182; 713/200; 713/201
(58) Field of Search ................................ 713/194, 189, 713/182, 200, 201

(56) References Cited

U.S. PATENT DOCUMENTS

| | | | |
|---|---|---|---|
| 3,743,768 A | 7/1973 | Copland | 178/6.8 |
| 4,727,559 A | 2/1988 | Yokoyama et al. | 377/16 |
| 4,959,809 A | 9/1990 | Rogers et al. | 364/581 |
| 5,278,901 A | 1/1994 | Shieh et al. | 380/4 |
| 5,793,288 A | 8/1998 | Peterson et al. | 340/567 |
| 5,805,801 A | 9/1998 | Holloway et al. | 395/187.01 |
| 5,919,257 A * | 7/1999 | Trostle | 713/200 |
| 6,279,113 B1 * | 8/2001 | Vaidya | 713/201 |

OTHER PUBLICATIONS

Debar, H. "What is behavior–based intrusion detection" SANS Institute Resources, Intrusion Detection (Version 0.91), 1999 SANS Institute.

Halme, L. R. et al. "AINT Misbehaving: A Taxonomy of Anti–Intrusion Techniques" SANS Institute Resources, Intrusion Detection (Version 0.91), 1999 SANS Institute.

Brock, A. et al. Method of Operating an Intrusion Detection System According to a Set of Business Rules, IBM Patent Application, U.S. Appl. No. 09/851,286 filed May 8, 2001.

* cited by examiner

Primary Examiner—Thomas R. Peeso
(74) Attorney, Agent, or Firm—Schmeiser, Olsen & Watts; John R. Pivnichny

(57) ABSTRACT

An intrusion detection system monitors for signature events, which are part of base intrusion sets that include signature event counters, signature thresholds, and base actions. Associated with each base intrusion set is an action set including an action counter, an action threshold, and an action variable. The associated action counter is updated when the base action of the base intrusion set is invoked responsive to the count of associated signature events meeting the associated signature threshold. The action counter is compared with an action threshold. If the action counter meets the threshold, the associated action variable is updated. The action variable is then passed to an analysis engine comprising a set of rules, which analyses the action variable either in isolation or together with other action variables associated with other base intrusion sets. According to the analysis, an element of a base intrusion set or an action set may be changed.

22 Claims, 6 Drawing Sheets

DYNAMIC INTRUSION DETECTION FOR COMPUTER SYSTEMS

FILED OF THE INVENTION

The present invention applies generally to the field of computer security, and more particularly to an improved method of operating an intrusion detection system that protects a computer system from intrusions by vandals such as hackers.

BACKGROUND

Computer-based activities are now subject to electronic vandalism. A vandal, who is sometimes called a hacker in this context, may attempt to intrude upon a computer system in order to steal information in an act of industrial espionage, or to impede the operation of the computer by implanting a virus or by flooding the computer with bogus information, or to alter records to the detriment or the benefit of another party's interests or reputation.

Computers are often protected against hackers' intrusions by intrusion detection systems. An intrusion detection system monitors the activities on networks for particular events or patterns of events generally known as signatures. A signature is a set of events and transition functions that define a sequence of actions that constitute misuse or unauthorized use of the computer. For example, a misuse engine that relies upon signature monitoring is described in detail in U.S. Pat. No. 5,557,742.

More specifically, a signature may include a signature event such as stating occurrence of a particular pattern of bits, for example the pattern of bits that identifies logon-password failure. Associated with a signature event there may be a signature event counter for counting the number of times the signature event occurs. Associated with the signature event and the signature event counter there may be a signature threshold that differentiates between attempted intrusions and uneventful occurrences of the signature event. For example, the signature event may be required to occur J times in K minutes before an intrusion is suspected. Thus, the signature event "logon-password failure" may be judged to be suggestive of an intrusion when the signature event occurs more than five times in twenty minutes.

When the intrusion detection system observes activity that is suggestive of an intrusion, a system administrator may attempt to minimize the damage done by the intruder. For example, the occurrence of more than five logon-password failures for a given computer account over a twenty-minute interval of time may be a sign that an unauthorized party is attempting to gain access to that account by guessing passwords. To block this attempt at unauthorized access, the system administrator may lock the account under attack, or cause the account to be locked, and block the network access from the unauthorized party to the targeted account on the particular computer system.

Although today's intrusion detection systems provide a useful degree of protection, their effectiveness is limited by the static nature of the signature events and signature thresholds at their disposal, and the lack of state-transition knowledge that constitutes historical context. Once a signature event associated with an intrusion has been defined and a signature threshold set, broader circumstances and historical knowledge surrounding any attempted intrusion are not taken into account. As a result, the effectiveness of the intrusion detection system is significantly limited. This is unfortunate, because hackers' intrusions may have serious commercial or social consequences. Thus there is a need to improve intrusion detection systems so that they may use the best available information, taking into account historical knowledge and other circumstances that surround evidence of attempted intrusions, in order to provide the best attainable protection against intruding vandals.

SUMMARY

The present invention improves the operation of an intrusion detection system by taking into account historical knowledge and broader circumstances, such as global knowledge available to the intrusion detection system, that surround evidence of an attempted or suspected intrusion.

In the description that follows, the concept of a signature mentioned above is enlarged here to encompass a base intrusion set. A base intrusion set may include a signature event, a signature event counter, a signature threshold, an action to be taken when a count of occurrences of the signature event crosses the signature threshold, which action is called here a base action, and a weight associated with the base action. An exemplary base intrusion set might include the signature event "occurrence of password failure," a signature event counter for the signature event, a signature threshold "five password failures in one minute," a base action "alert administrator," and a weight "moderate," which the administrator might use to interpret the urgency of the alert.

According to the present invention, an action set may be associated with each base intrusion set. The action set may include an action counter, an action threshold, and an action variable. Whenever the base action of a base intrusion set is invoked, the value of the action counter of the associated action set is altered, for example incremented or decremented. In the case of the exemplary base intrusion set introduced above regarding logon-password failure, the associated action counter might be increased by one each time an alert is sent to the administrator.

Within an action set, an action threshold may be associated with each action counter. Whenever the value of an action counter is changed, the new value of the action counter may be compared with the associated action threshold. If the new value of the action counter has reached the action threshold, the state of an action variable associated with the action counter and action threshold may be altered. In the case of the exemplary base intrusion set regarding logon-password failure, the action threshold might be the occurrence of twenty alerts in one hour, and the associated action variable might be binary. Upon the occurrence of the twentieth alert before the expiration of the one-hour period, the state of the binary action variable might be changed from zero to one.

An intrusion detection system according to the present invention may include a plurality of base intrusion sets, and consequently a plurality of action sets and action variables. Whenever the value of any one of the action variables is changed, the new value of that action variable is passed to an analysis engine comprising a set of rules. The analysis engine analyzes the incoming action variable according the set of rules, either in isolation or together with one or more other action variables associated with one or more other base intrusion sets. According to the outcome of the analysis, the analysis engine may command a change to any of the base intrusion sets or a change to any of the action sets.

In the example above, when the binary variable associated with password failure changed from zero to one, the binary variable associated with password failure would be passed to the analysis engine. The analysis engine might contain the rule "set the signature threshold to ten occurrences of password failure in sixty seconds, effective for the next 30 minutes."

The foregoing illustrates analysis of an action variable in isolation. The analysis engine may also include rules that operate on more than one action variable. For example, the analysis engine might include the rule:

"evaluate the Boolean expression S=(V1 and V2)XOR (V3); if S=1 set the action threshold for password failure to three password-failure alerts in sixty seconds, effective for the next 20 minutes,"

where V1 is the binary action variable associated with the logon-password failure base intrusion set, and V2 and V3 are binary action variables associated with other base intrusion sets.

Thus, by automatically altering base intrusion sets and action sets, responsive to current events or past events, the present invention improves the operation of an intrusion detection system by enabling the intrusion detection system to adapt to broader circumstances and global state knowledge that surround potential intrusions. These and other aspects of the invention will be more fully appreciated when considered in the light of the following detailed description and drawings.

DETAILED DESCRIPTION

The present invention improves the operation of an intrusion detection system by enabling the intrusion detection system to alter base intrusion sets and action sets, and thereby to adapt to broader circumstances such as machine state that accompany evidence that is suggestive of an intrusion.

Figure 1:
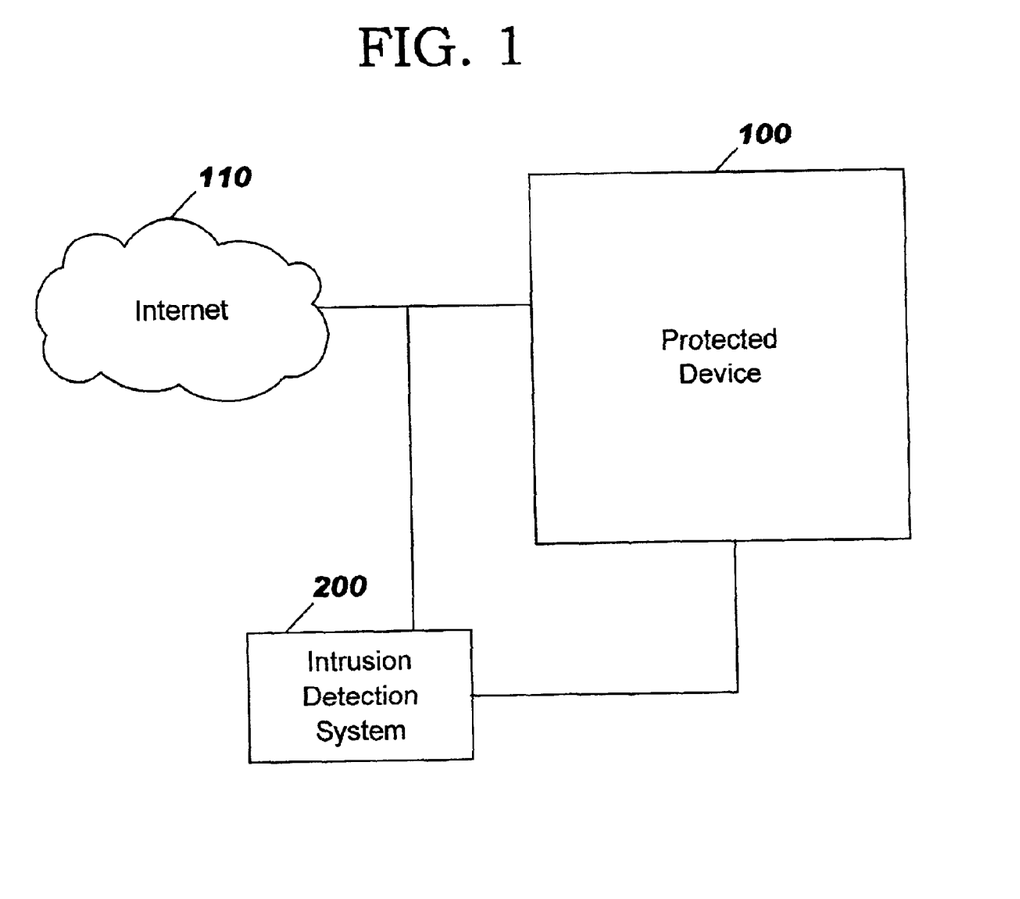
FIG. 1 shows an environment suitable for use of the present invention.

FIG. 1 shows an exemplary environment that is suitable for use of the present invention. In FIG. 1, a protected device 100 such as a computer, a server, a workstation, or other similar device is connected to the Internet 110 or other communication network. Messages flow to the protected device 100 from sources local to the protected device 100, or from other sources (not shown) also connected to the Internet 110 or other communication network. Some of these messages may be emissaries of an attempt to intrude upon the protected device 100, such as an attempt to steal information held by the protected device 100, or to alter information held by the protected device 100, or to impede the protected device 100 by implanting a virus or by filling the protected device 100 with bogus messages, or otherwise to gain entry into the protected device 100 or to impede the operation of the protected device 100. FIG. 1 also shows an intrusion detection system 200, the purpose of which is to guard against such intrusions.

Although the protected device 100 is connected to a communication network such as the Internet 110 in FIG. 1 for purposes of illustration, network connection is not a necessary condition of the present invention.

Figure 2:
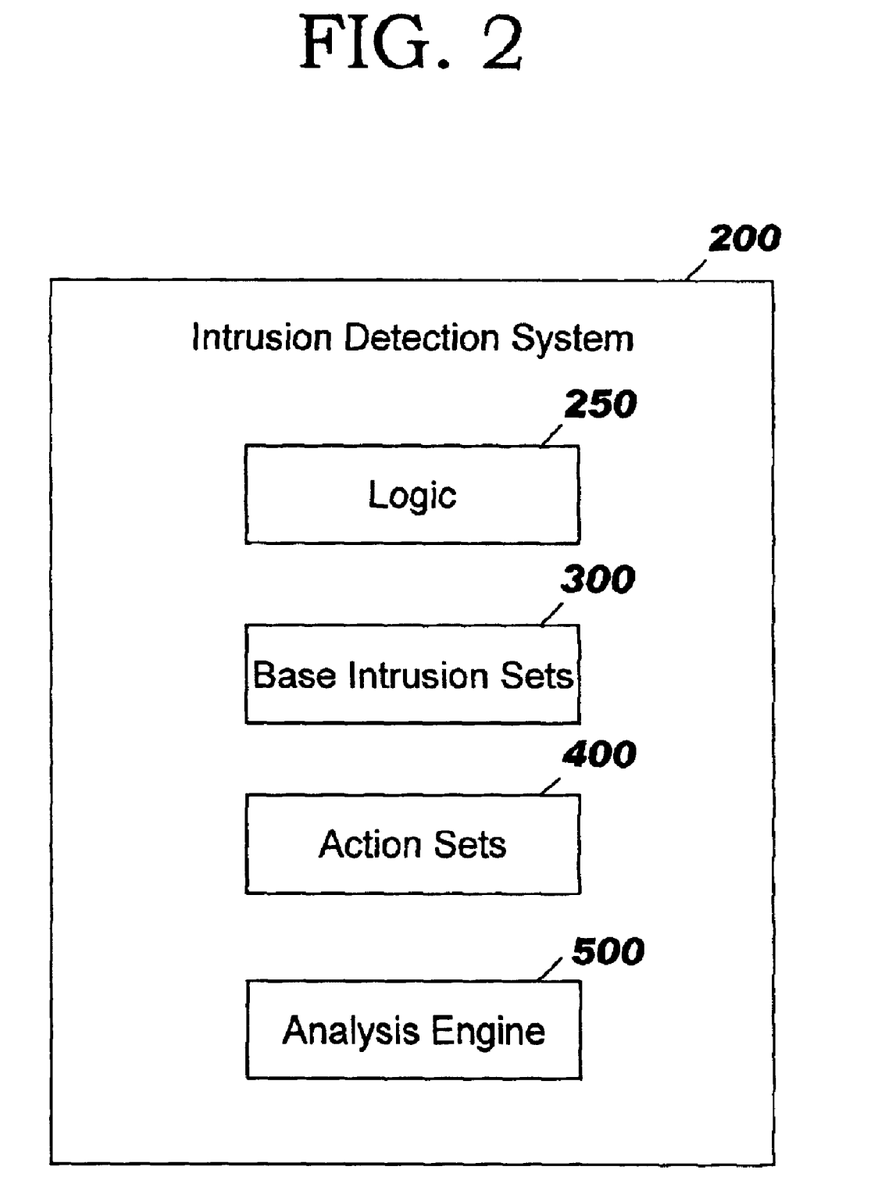
FIG. 2 shows aspects of the structure of an intrusion detection system according to the present invention.

FIG. 2 shows aspects of the structure of an intrusion detection system 200 according to the present invention. As shown in FIG. 2, the inventive intrusion detection system 200 includes logic 250 which may be a programmable processor and which oversees the operation of the intrusion detection system 200, base intrusion sets 300 (described more fully below), action sets 400 (described more fully below), and an analysis engine 500 that includes analysis rules (described more fully below). The particular structure of FIG. 2 is shown for clarity rather than limitation, and the invention encompasses other related structures as well as the particular structure of FIG. 2. For example, although FIG. 2 shows the intrusion sets 300, the action sets 400, and the analysis engine 500 as separate and internal to the intrusion detection system 200, any of these may be external to the intrusion detection system 200, for example incorporated instead into an external database. Also, the intrusion sets 300, the action sets 400, and the analysis engine 500 may be paired or combined into a single structure, and the resultants or resultant may be either internal or external to the intrusion detection system 200. Also, the analysis engine 500 may incorporated into the logic 250, and so forth.

Figure 3:
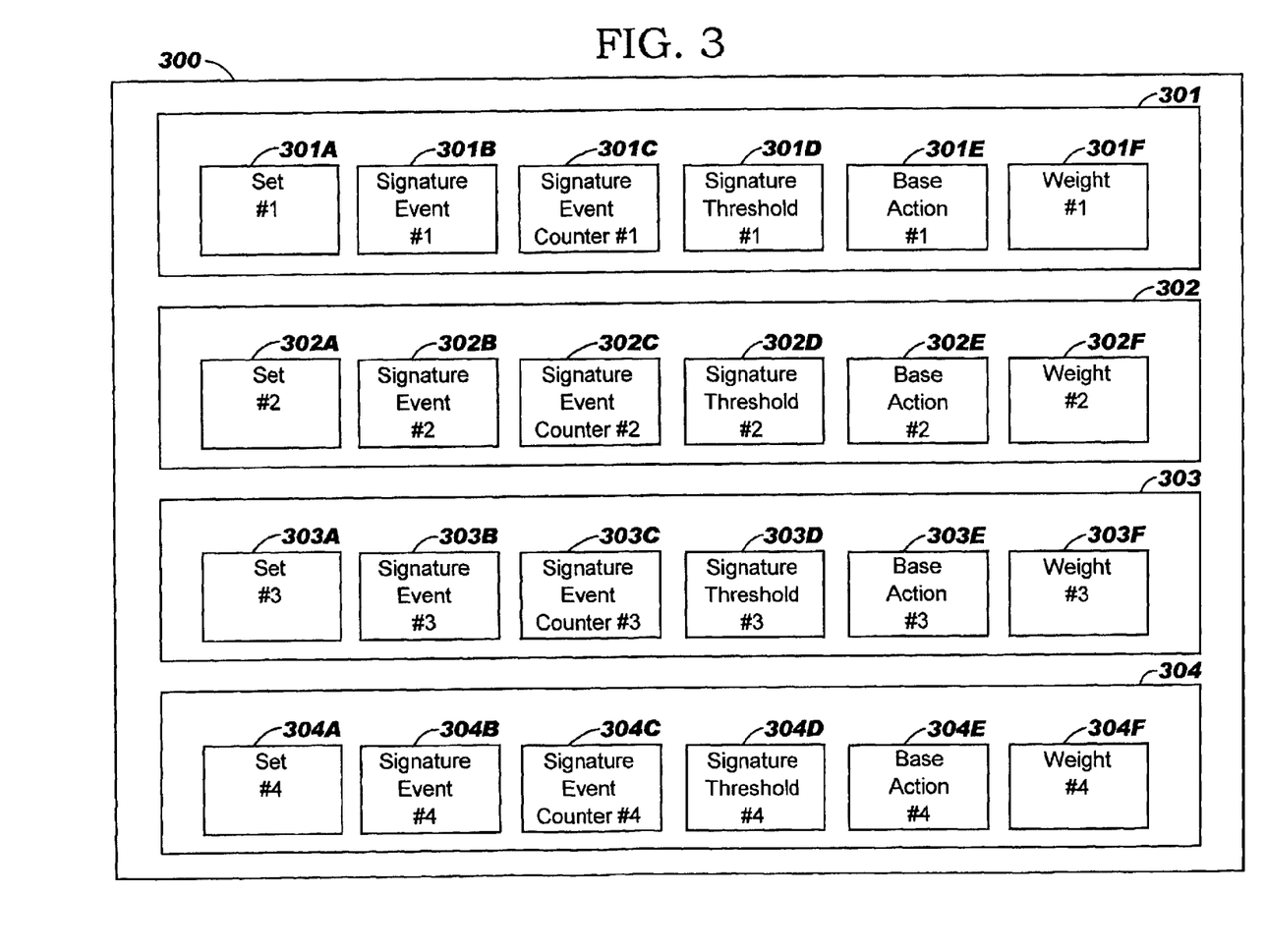
FIG. 3 shows an illustrative structure of a collection of base intrusion sets available to the intrusion detection system of FIG. 2.

FIG. 3 illustrates an exemplary structure of the base intrusion sets 300, wherein four individual base intrusion sets 301 through 304 are shown. The number four is selected here only for purposes of illustration; the present invention encompasses numbers of individual base intrusion sets both greater than four and less than four as well as equal to four. As shown in FIG. 3, the individual base intrusion sets 301 through 304 may include intrusion set identifiers 301A through 304A, signature events 301B through 304B, signature event counters 301C through 304C, signature thresholds 301D through 304D, base actions 301E through 304E, and weights 301F through 304F. Thus, each base intrusion set makes an association among an intrusion set identifier, a signature event, a signature event counter, a signature threshold, a base action, and a weight.

Within the individual base intrusion sets 301 through 304 of FIG. 3, the intrusion set identifiers 301A through 304A may include alphanumeric tags, such that no two of the individual intrusion sets 301 through 304 have intrusion set identifiers 301A through 304A with equal alphanumeric values.

Within the individual base intrusion sets 301 through 304 of FIG. 3, the signature events 301B through 304B may include bit patterns or other identifiers associated with attempted intrusions. For example, one of the signature events 301B through 304B might be a bit pattern associated with the event "logon-password failure." Another of the signature events 301B through 304B might be a bit pattern associated with the event "arrival of a message from source ID aaa.bbb.ccc.ddd," where the specified source ID is known to have been used in the past by a hacker.

Within the individual base intrusion sets 301 through 304 of FIG. 3, the signature event counters 301C through 304C keep count of the numbers of occurrences of the associated signature events 301B through 304B. With each occurrence of a signature event, the value of the associated signature event counter may be increased by one; this method of operation is not a necessary condition of the present invention, however, and a signature event counter may be incremented or decremented by any amount in response to the occurrence of an associated signature event.

Within the individual intrusion base sets 301 through 304 of FIG. 3, the signature thresholds 301D through 304D may include decision-level information, frequency-of-occurrence stipulations, count-reset instructions associated with a signature, and so forth. Decision-level information may be a numerical value, for example "ten or more occurrences of the signature event." Frequency-of-occurrence stipulations may be temporal, for example "in sixty minutes or less." Reset instructions may be instructions for re-setting the associated signature event counter, for example "reset associated signature event counter upon ten occurrences" or "reset associated signature event counter every sixteen minutes."

Within the individual intrusion sets 301 through 304 of FIG. 3, the base actions 301E through 304E may include instructions either in natural language that is suitable for use by a system administrator or in data processing language that is suitable for use by an automated network management system. Examples of such instructions may be "send a message to lock-out user account WSM-3 of the targeted system," or "send red alert to system administrator," or "record event in logbook," and so forth.

Within the individual base intrusion sets 301 through 304 of FIG. 3, the weights 301F through 304F may include numerical or other indicators of the importance of the suspected intrusion. For example, suspected intrusions might be classified according to a three part scheme—those of low importance and therefore low numerical weight, which might give rise to a "blue alert" that might be recorded in a logbook without further action; those of moderate importance and therefore mid-range numerical weight, which might give rise to a "yellow alert" that might be sent to a network administrator; and those of high importance and therefore high numerical weight, which might give rise to a "red alert" that results in a page of a chief security officer.

Figure 4:
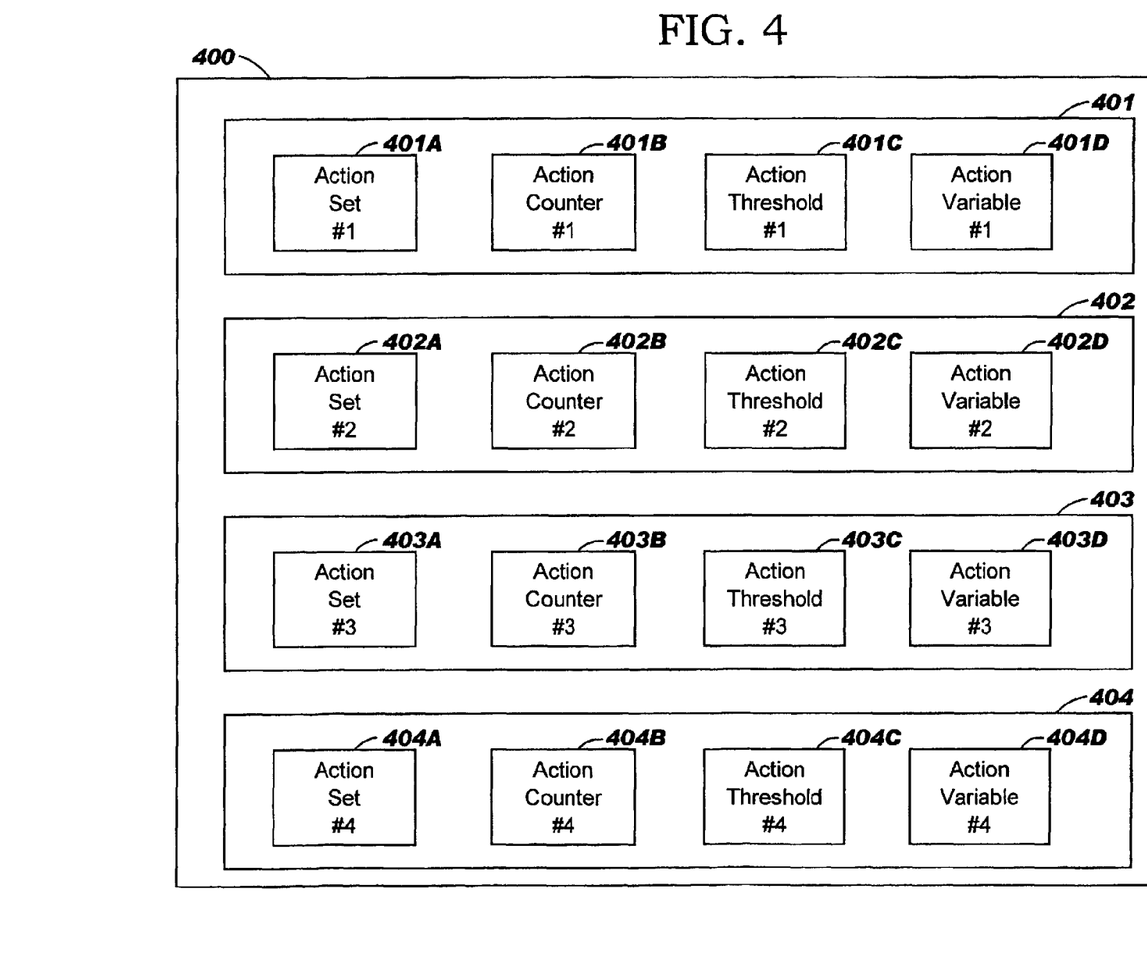
FIG. 4 shows an illustrative structure of a collection of action sets available to the intrusion detection system of FIG. 2.

FIG. 4 illustrates an exemplary structure of the action sets 400, wherein four individual action sets 401 through 404 are shown. The number four is selected here only for purposes of illustration; the present invention encompasses numbers of individual action sets both greater than four and less than four as well as equal to four. As shown in FIG. 4, the individual action sets 401 through 404 may include action set identifiers 401A through 404A, action counters 401B through 404B, action thresholds 401C through 404C, and action variables 401D through 404D. Thus, each action set makes an association among an action set identifier, an action counter, an action threshold, and an action variable.

Within the individual action sets 401 through 404 of FIG. 4, the action set identifiers 401A through 404A may include alphanumeric tags, such that no two of the individual action sets 401 through 404 have action set identifiers 401A through 404A with equal alphanumeric values. The action sets 401 through 404 may use the same alphanumeric tags as the associated base intrusion sets 301 through 304, thereby to pair or to associate action sets and base intrusion sets by the use of common set identifiers.

Within the individual action sets 401 through 404 of FIG. 4, action counters 401B through 404B keep count of the number of times an associated base action 301E through 304E is taken or invoked. For example, if base intrusion set 302 and action set 402 are associated, then action counter 402B is changed every time base action 302E is taken.

Within the individual action sets 401 through 404 of FIG. 4, the action thresholds 401C through 404C may include decision-level information, frequency-of-occurrence stipulations, counter-reset instructions for the action counters 401B through 404B, and so forth. Decision-level information may be a numerical value, for example "ten or more occurrences." Frequency-of-occurrence stipulations may be temporal, for example "in sixty minutes or less." Reset instructions may be instructions for re-setting an action counter 401B through 404B, for example "reset action counter when it reaches the value ten" or "reset action counter every sixteen minutes."

Within the individual action sets 401 through 404 of FIG. 4, the action variables 401D through 404D may be binary variables, although they a not necessarily so limited, and may be representations of integers or floating point numbers or M-ary or fuzzy logical states. The values of the action variables 401D through 404D may be changed in response to comparisons of the action counters 401B through 404B to the action thresholds 401C through 404C, or to explicit or implicit instructions from the analysis engine 500. For example, whenever the value of the action counter 401B changes, the value of the action counter 401B may be compared with the action threshold 401C, and the action variable 401D changed from binary zero to binary one when the value of the action counter 401B reaches or crosses the action threshold 401 C.

Figure 5:
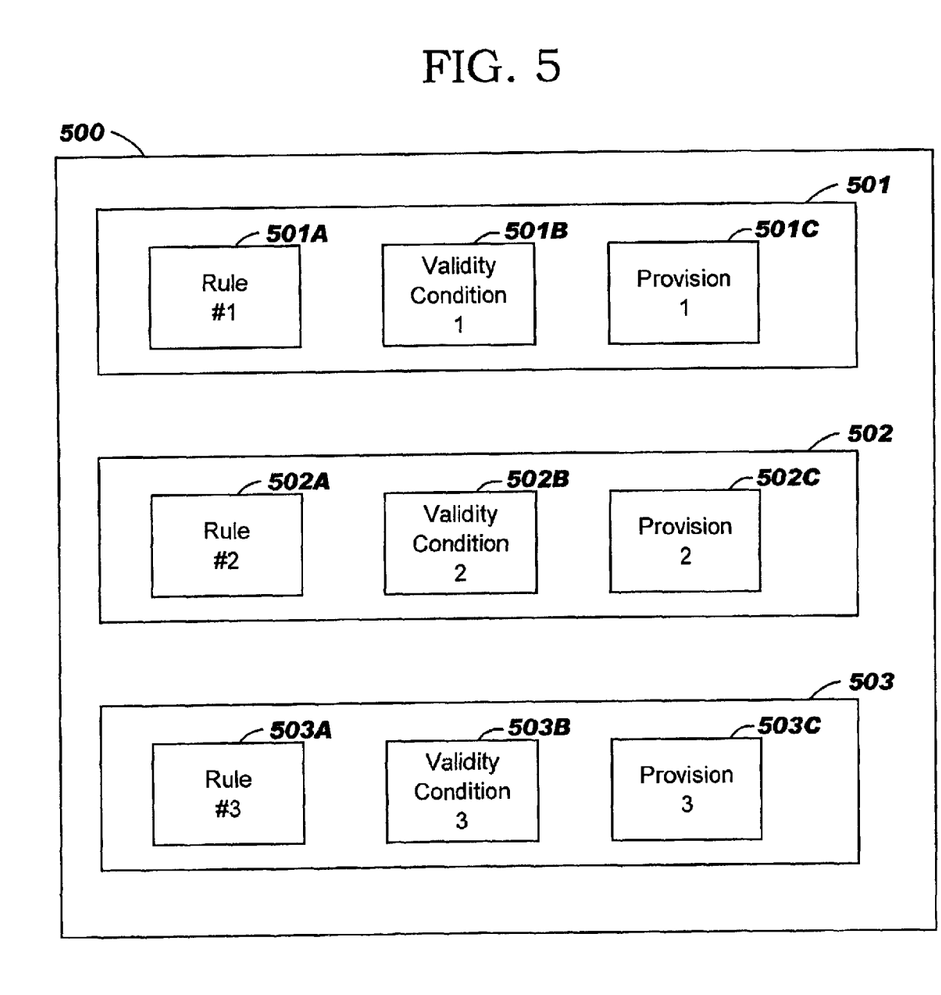
FIG. 5 shows an illustrative structure of a set of rules for an analysis engine used by the intrusion detection system of FIG. 2.

FIG. 5 illustrates an exemplary structure of a set of rules included in the analysis engine 500, wherein three individual rules 501 through 503 are shown. The number three is chosen here for illustration, and the invention may accommodate more than three or fewer than three individual rules as well as exactly three. As shown in FIG. 5, the individual rules 501 through 503 may include rule identifiers 501A through 503A, validity conditions 501B through 503B under which provisions of the rules are operative, and provisions 501C through 503C, which are alterations to be imposed upon the base intrusion sets 300 or the action sets 400 subject to the satisfaction or the logical truth (or falsity) of the validity conditions 501B through 503B.

Within the individual rules 501 through 503 of FIG. 5, the rule identifiers 501A through 503A may be alphanumeric tags associated with the rules, for example to provide convenience when editing the rules.

Within the individual rules 501 through 503 of FIG. 5, the validity conditions 501B through 503B may include mathematical or logical functions or other expressions. For the validity conditions 501B through 503B, variables may be the action variables 401D through 404D, which may be Boolean variables, M-ary logical variables, real numbers, and so forth. The rules 501 through 503 may be evaluated each time one or more of the action variables 401D through 404D changes value. If the validity conditions 501B through 503B of one or more of the rules 501 through 503 are satisfied, provisions 501C through 503C, which are described below, associated with the satisfied rules are invoked. For example, the analysis engine 500 might include a rule 501 with the following elements: a validity condition 501B of S=(V1 and V2)XOR(V3) satisfied by S=1; and a provision 501C to "set the action threshold 402C for password failure to three password-failure alerts in sixty seconds, effective for the next 20 minutes;" where V1 is the binary action variable 402D associated with the password failure base intrusion set 302, and V2 and V3 are binary action variables 401D and 403D associated with other base intrusion sets 301 and 303.

Within the individual rules 501 through 503 of FIG. 5, the provisions 501C through 503C may be alterations to be imposed upon the base intrusion sets 300 and the action sets 400. Alterations may be imposed upon the signature events 301B through 304B, the signature event counters 301C through 304C, the signature thresholds 301D through 304D, the base actions 301E through 304E, or the weights 301F through 304F of the individual base intrusion sets 301 through 304; or imposed upon the action counters 401B through 404B, or the action thresholds 401C through 404C, or the action variables 401D through 404D of the individual action sets 401 through 404. For example, one of the provisions 501C through 503C might be "set the signature event of base intrusion set number 3 to bit pattern hexadecimal AE30B4," or "set the decision value of the signature threshold of base intrusion set number 4 to five occurrences of the signature event," or "set the action threshold of action set number 1 to ten occurrences," and so forth.

Figure 6:
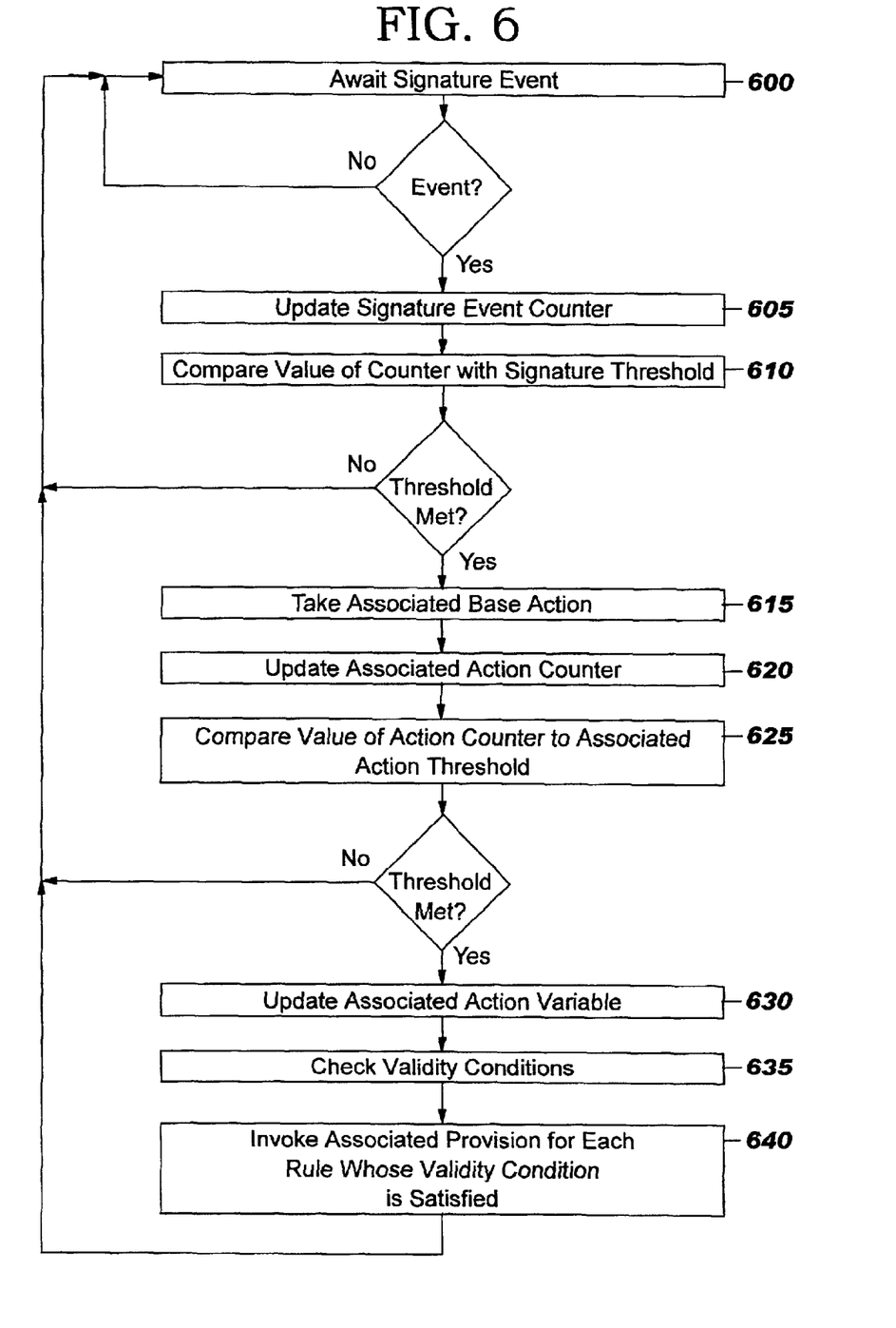
FIG. 6 shows aspects of the operation of the intrusion detection system of FIG. 2 according to the present invention.

FIG. 6 shows aspects of the operation of the logic 250 of the intrusion detection system 200 according to the present invention. The intrusion detection system 200 monitors system activity involving the protected device 100, and awaits the occurrence of a signature event (step 600). When a signature event is not present, the intrusion detection system 200 continues to await the arrival of a signature event (step 600).

Otherwise (i.e., a signature event is present), the value of associated signature event counter of the set of signature event counters 301C through 304C is updated accordingly, for example increased by one (step 605). The value of the signature event counter is then compared with the associated signature threshold of the set of signature thresholds 301D through 304D (step 610). If the value of the signature event counter does not meet (or cross) the associated signature threshold, the intrusion detection system 200 continues to await the arrival of a signature event (step 600).

Otherwise (i.e., the value of the signature event counter meets (or crosses) the signature threshold, and an intrusion has therefore been detected), the associated base action of the set of base actions 301E through 304E is taken (step 615). For example, the base action that is invoked may be to send an alert to a system administrator. The associated action counter of the set of action counters 401B through 404B is updated accordingly, for example increased in value by one (step 620). The value of the associated action counter is then compared with the associated action threshold of the set of action thresholds 401C through 404C (step 625). If the updated value of the action counter does not meet (or cross) the associated action threshold, the intrusion detection system 200 returns to await arrival of a signature event (step 600).

Otherwise (i.e., the value of the updated action counter meets (or crosses) the associated action threshold), the associated action variable of the set of action variables 401D through 404D is updated (step 630). For example, when the value of the action counter meets (or crosses) the value of the associated action threshold, the value of the associated action variable may be set to binary one.

The analysis engine 500 then checks the validity conditions 501B through 503B of the rules 501 through 503 using the values of the action variables 401D through 404D (step 635). For each of the validity conditions 501B through 503B that is satisfied, the associated provision of the set of provisions 501C through 503C is invoked (step 640), which may change elements of the base intrusion sets 300 or the action sets 400. The intrusion detection system 200 then returns to await the arrival of a signature event (step 600).

Form the foregoing description, those skilled in the art will appreciate that the present invention improves the performance of an intrusion detection system by enabling the intrusion detection system to use the best available information, in particular by enabling the intrusion detection system to modify its own intrusion sets and action sets in response to system state and historical information. The foregoing description is illustrative rather than limiting, however, and the scope of the present invention is limited only by the following claims.

We claim:

1. A method of operating an intrusion detection system, the method comprising the steps of:

taking a base action in response to detecting an intrusion;

updating an action counter in response to taking the base action;

comparing the value of the action counter to an action threshold;

updating an action variable when the value of the action counter meets the action threshold;

checking a validity condition for satisfaction dependent upon the action variable; and invoking a provision associated with the validity condition when the validity condition is satisfied.

2. The method of claim 1, wherein the provision changes an element of a base intrusion set.

3. The method of claim 1, wherein the provision changes an element of an action set.

4. The method of claim 3, wherein the element of the action set is an action counter.

5. The method of claim 3, wherein the element of the action set is an action threshold.

6. The method of claim 3, wherein the element of the action set is an action variable.

7. The method of claim 1, wherein the action variable is selected from the group consisting of a binary variable, an integer variable, a floating point variable, a fuzzy logical variable, and a M-ary variable.

8. The method of claim 1, wherein the validity condition includes a mathematical expression or a logical expression.

9. The method of claim 1, wherein said checking step comprises checking the validity condition for satisfaction dependent upon the section variable and upon at least one other action variable.

10. The method of claim 1, further comprising a plurality of rules, wherein a rule of the plurality of rules comprises the validity condition.

11. A method of operating an intrusion detection system, the method comprising the steps of;

taking a base action in response to detecting an intrusion;

updating an action counter in response to taking the base action;

comparing the value of the action counter to an action threshold;

updating an action variable when the value of the action counter meets the action threshold;

checking a validity condition for satisfaction dependent upon the action variable; and invoking a provision associated with the validity condition when the validity condition is satisfied, wherein the provision changes an element of a base intrusion set, and wherein the element of the base intrusion set is selected form the group consisting of a signature event, a signature event counter, a signature threshold, a base action, and a weight.

12. A method of operating an intrusion detection system, the method comprising the steps of:

detecting a signature event;

updating a signature event counter responsive to detecting the signature event;

comparing the value of the signature event counter to a signature threshold;

updating an action counter when the value of the signature event counter meets the signature threshold;

comparing the value of the action counter to an action threshold;

updating an action variable when the value of the action counter meets the action threshold;

checking a validity condition for satisfaction dependent upon the action variable; and invoking a provision associated with the validity condition when the validity condition is satisfied.

13. The method of claim 12, wherein the provision changes an element of a base intrusion set.

14. The method of claim 13, wherein the element of the base intrusion set is a signature event.

15. The method of claim 13, wherein the element of the base intrusion set is a signature event counter.

16. The method of claim 13, wherein the element of the base intrusion set is a signature threshold.

17. The method of claim 13, wherein the element of the base intrusion set is a base action.

18. The method of claim 13, wherein the element of the base intrusion set is a weight.

19. The method of claim 13, wherein the provision changes an element of an action set.

20. The method of claim 19, wherein the element of the action set is an action counter.

21. The method of claim 19, wherein the element of the action set is an action threshold.

22. The method of claim 19, wherein the element of the action set is an action variable.

* * * * *

UNITED STATES PATENT AND TRADEMARK OFFICE
CERTIFICATE OF CORRECTION

PATENT NO. : 6,928,549 B2
DATED : August 9, 2005
INVENTOR(S) : Brock et al.

It is certified that error appears in the above-identified patent and that said Letters Patent is hereby corrected as shown below:

Column 8,
Line 4, delete "form" and insert -- from --.
Line 47, delete "section" and insert -- action --.

Signed and Sealed this

First Day of November, 2005

JON W. DUDAS
*Director of the United States Patent and Trademark Office*